Oct. 17, 1944.   H. H. BAKKEN   2,360,538
HOT PAN AND PLATE LIFTER
Filed Nov. 15, 1943

INVENTOR.
Hans H. Bakken
BY Henry J. E. Metzler
AGT.

Patented Oct. 17, 1944

2,360,538

UNITED STATES PATENT OFFICE 2,360,538

HOT PAN AND PLATE LIFTER

Hans H. Bakken, Pueblo, Colo.

Application November 15, 1943, Serial No. 510,276

2 Claims. (Cl. 294—31)

This invention relates to culinary appliances and particularly to instruments used for lifting or carrying hot pots, pans or dishes.

The primary object of the invention is to provide a container lifting device which is simple and easy to operate and economical to manufacture, assemble and package.

Another object of the invention is to construct a device of the character mentioned which is made of readily obtainable standard materials.

A further object is to provide a hot pot holder for domestic use of relatively few parts which will not get out of order or be difficult to keep clean and sanitary.

Still another object of the present invention is to provide such a device with two arms which are spread out from the center of the grip mechanism and which are adapted to support the rim of a vessel at some distance on both sides from the grip mechanism in order to prevent the vessel from turning over and to improve the grip effect of the device.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawing.

Similar numerals refer to similar parts throughout the several views.

Figure 1:
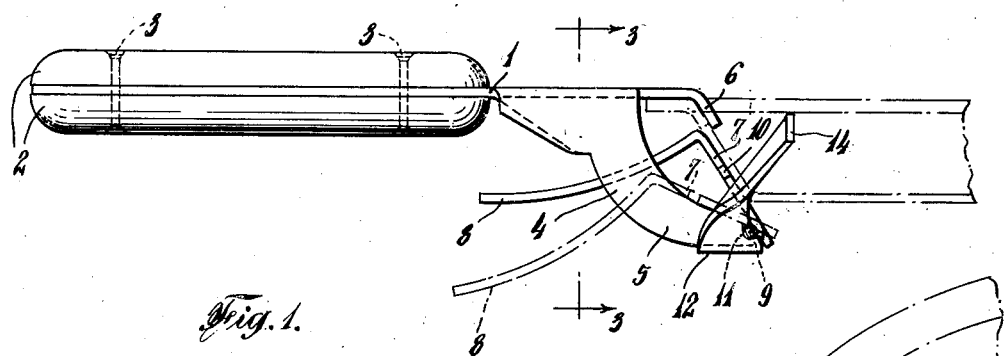
Figure 1 is a side elevation of the entire device.

The three main parts of the device constituting the present invention can be made of the same standard material, preferably of $\frac{1}{16}$ inch sheet metal or steel, and each part can be made in one single working process. The first part is the frame or support member consisting of a longitudinal handle portion 1, which can be provided with any suitable heat insulation, for instance with wooden members 2 secured thereto by means of rivets 3 or in any other suitable manner, of two parallel downwardly depending side portions 4 having lugs 5 at their outer ends, and of a downwardly inclined extremity 6, which is above the lugs 5.

The second part is a strip of metal which is bent so as to form a jaw member 7 and a rearwardly extending jaw handle 8. The jaw member 7 is provided with laterally protruding ears 9 and 10. The ears 9 engage the holes of the lugs 5, thus securing the jaw member 7 pivotally to the lugs 5. The ears 10 are adapted to limit the downward movement of the jaw member 7 by engaging the upper edges of the lugs 5 if the jaw member is in its lowest position, as indicated in dash- and dotted lines in Fig. 1.

The third part is another strip of metal the center part 12 of which is rectangularly secured to the lower edges of the lugs 5 by means of soldering or in any other suitable manner, and the side parts 14 of which extend upwardly as may be seen in the drawing.

Figure 2:
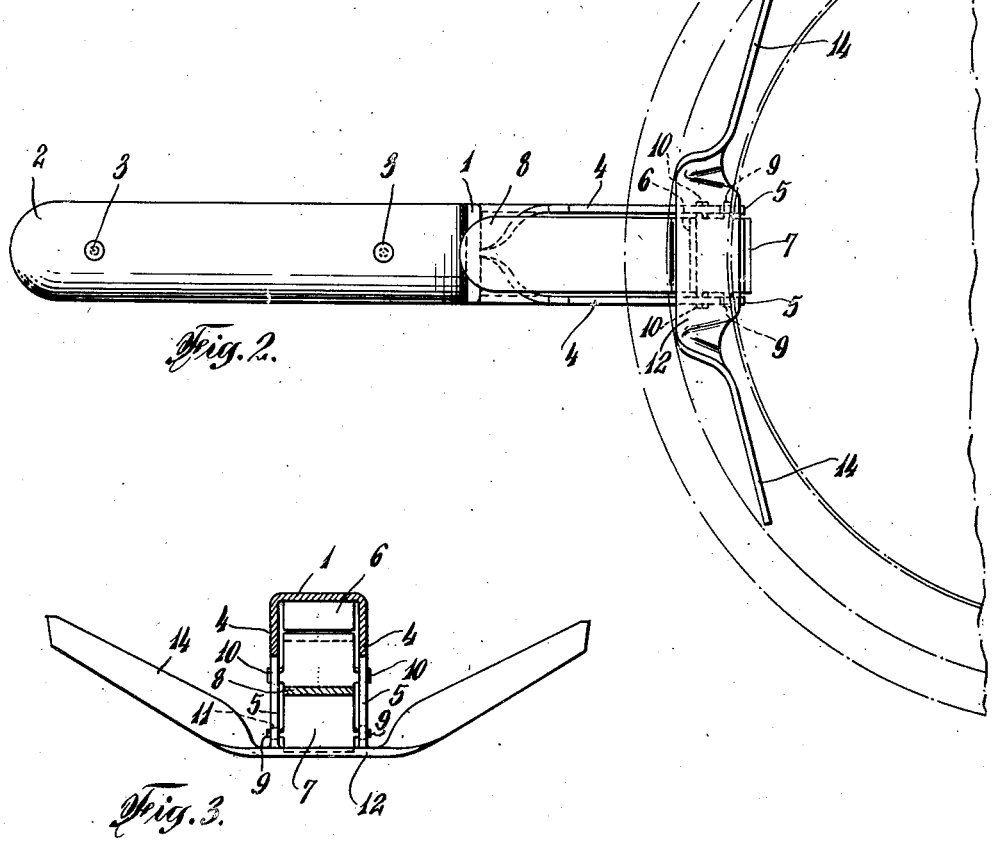
Fig. 2 is a bottom plan view of the device.
Figure 3:
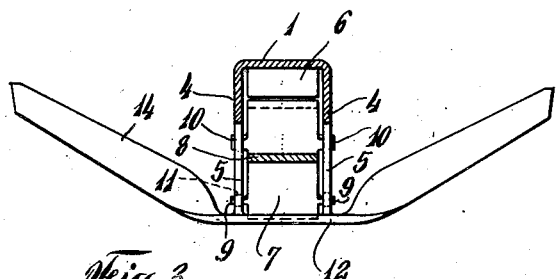
Fig. 3 is a sectional view on the line 3—3 of Fig. 1.

In order to lift a hot vessel from a stove one engages the rim 15 of the pan or pot, which is indicated in dash- and dotted lines in Figs. 1 and 2, with the downwardly inclined extremity 6 from above and with the jaw member 7 and the arms 14 from below (Fig. 1), and presses the jaw handle 8 upwards. The vessel is then gripped firmly and can be removed safely from the stove; thereby the arms 14 prevent the vessel from turning over.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

Having thus described my invention, what I claim and desire to secure by Letters Patent in the United States is:

1. A hot pan and plate lifter comprising a handle; a support member projecting from one end of the handle and having a downwardly inclined extremity and two parallel, downwardly depending side portions; a jaw member being pivotally secured between said side portions and having a handle portion which extends rearwardly over said side portion; and a bracket member having two upwardly extending arms and being secured to the lower part of said side portions; said jaw member being adapted to hold the rim of a pan in engagement with the downwardly inclined extremity of said support member, and said arms being adapted to support the rim of the pan at some distance from the place where it is held by said jaw member, substantially as described.

2. A hot pan and plate lifter comprising a support member which consists of a handle portion provided with heat insulation, of two parallel downwardly depending side portions having lugs at their outer ends, and of a downwardly inclined extremity above said lugs; a flat strip of metal which is bent so as to form a jaw member having a rearwardly extending handle and which is pivotally secured to said lugs; and another strip of metal secured to the lower part of said lugs and bent so as to form two arms which extend at right angles to said lugs; said jaw member being adapted to hold the rim of a pan in engagement with the downwardly inclined extremity of said support member, and being adapted to support the rim of the pan at some distance from the place where it is held by said jaw member, substantially as described.

HANS H. BAKKEN.